Patented June 19, 1945

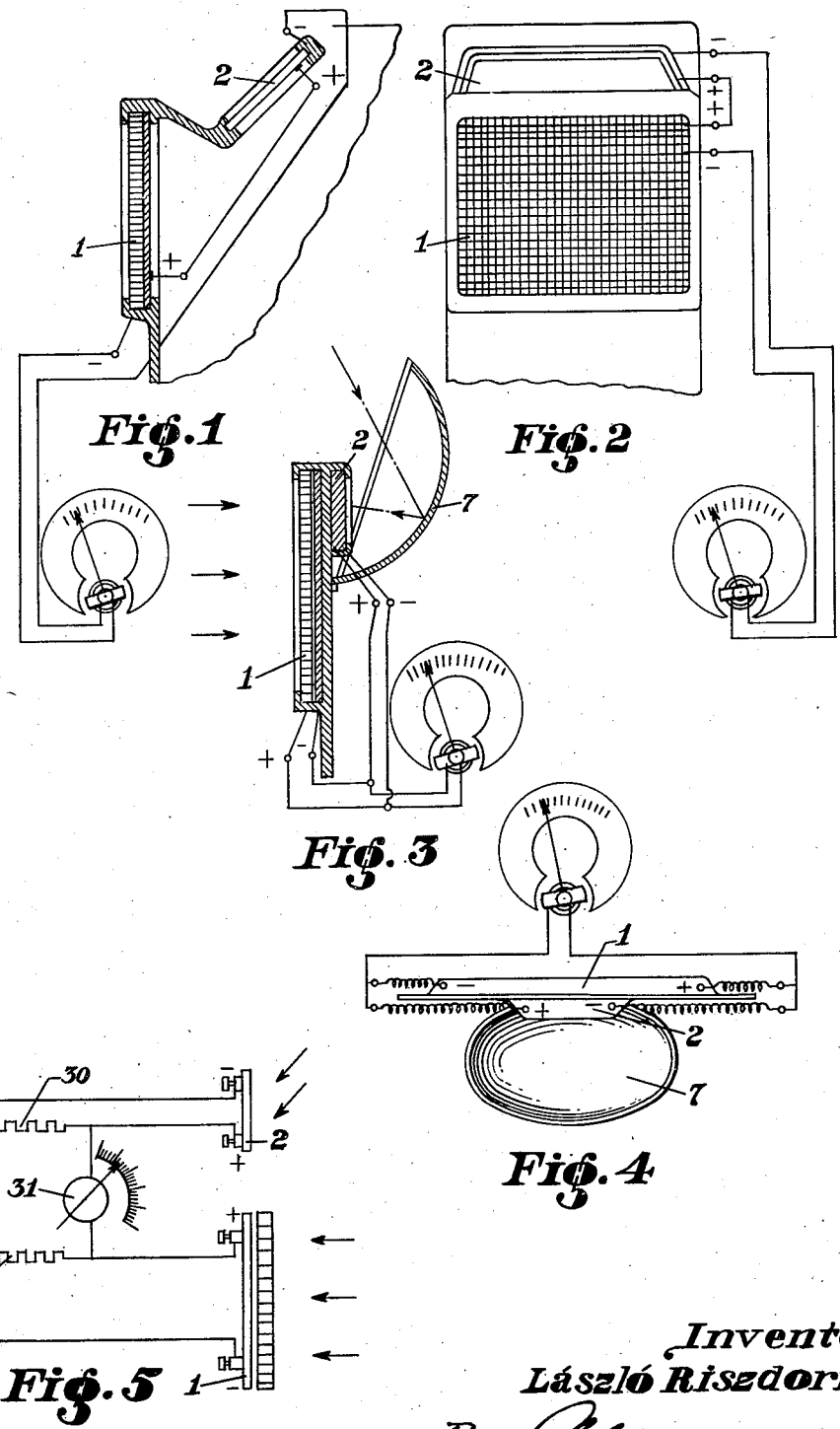
June 19, 1945. L. RISZDORFER 2,378,433
PHOTOELECTRIC EXPOSURE METER
Filed Sept. 23, 1940
Inventor:
László Riszdorfer
By Attorney.

2,378,433

UNITED STATES PATENT OFFICE 2,378,433

PHOTOELECTRIC EXPOSURE METER

László Riszdorfer, Budapest I, Hungary; vested in the Alien Property Custodian

Application September 23, 1940, Serial No. 357,992
In Hungary August 26, 1939

5 Claims. (Cl. 88—23)

The magnitude of the angle of incidence under which the light falls on the photo-cells of the exposure meters of the types known up to now, as well as on those of the semi-automatic or automatic light control devices of the photo-cell type employed in connection with photographic cameras, amounts to about 60 to 80 degrees; in the case of some devices this angle is even greater. This is due to the fact that in case of a smaller image angle, the quantity of light transmitted to the cell will not be sufficient to satisfy practical requirements. Owing to the use of an image angle of so great magnitude, it is an average quantity of light that will reach the photo-cell, so that the photo-cell will practically never be operated by the light of a definite point, but by the light reaching the photo-cell from the sky, from the ground and from various other objects jointly, i. e. by the mean figure of the quantities of light reaching the cell from all these different quarters.

In practice this gives rise to different defects. Notably, in the case of exposure meters of this type of design, or in the case of photographic cameras equipped with a semi-automatic or completely automatic device of the photo-cell type operated by means of a photo-cell having such an image angle, the measurement of illumination effected on the basis of the average quantity of light reaching the cell, and accordingly the adjustment for perfect exposure of the photographic cameras equipped with the said devices, will only be perfect if the source of light (sun or lamp) is situated behind the exposure meter, i. e. behind the person taking the photograph, that is to say if the taking of the photographs is effected with so-called flat illumination. If, however, the taking of the photograph or the measurement of the necessary amount of exposure takes place in side or opposed light, this measurement of the necessary amount of exposure according to average quantity of light, and, accordingly, the exposure effected by means of a camera, equipped with a device of the kind referred to will be incorrect. This is due to the fact that it is always on the basis of adjustment for the parts in shadow that the measurement of the necessary amount of exposure and the exposure itself, respectively, have to be effected. This means in practice that the actual amount of exposure which has to be employed will in the case of side light exceed the figures of exposure obtained on the basis of the average quantity of light by about 30 to 50%, in the case of opposed light by 50 to 100% or possibly even by more.

Owing to the great latitude offered by the black and white emulsion substance, this fault will not manifest itself in any striking manner in the case of the devices for the measurement of the necessary amount of exposure or for the control of light which are operated on the basis of an average quantity of light of the types employed up to now, but it will present itself all the more strikingly in the case of colour photography, for which, accordingly, the devices of this kind can only be used in the case of the so-called flat exposure of the subject. Notably, in the case of side or opposed light it is necessary, for the purposes of measurement, either to approach these devices quite closely to the shadow portions of the object to be photographed, which means a great deal of inconvenience and loss of time, or to act according to a judgment of conditions of illumination based on an estimate, which method may give rise to very many errors, and degrades the exposure meter of the photo-cell type to the position of an instrument the use of which must be based on personal judgment.

Accordingly, only imperfect results have been secured from the use of known devices based solely on the so-called total illumination value or not depending primarily on the contrasts of illumination of the object to be photographed.

The devices according to the invention eliminate all these drawbacks by the arrangement according to which to the device of the photo-cell type which up to now has been measuring exclusively the mean figure of illumination—which device may be not only an exposure meter but also a semi-automatic or completely automatic light control device—there is added an apparatus automatically compensating the said device, thereby enabling that the device should take into account not only the mean degree of illumination, but also the contrasts of light or contrasts of illumination of the object to be photographed, and also its colour values.

Notably, the contrasts of illumination of the object depend in the first place on the fact from what angle, based on the position of the photographer, the object to be photographed is illuminated by the source of light from which light falls on it. Notably, if the light falls on the object from behind the photographer, the data of measurement based on the average quantity of light do not require any correction. If, on the other hand, it is from the side that the light of the source of light, e. g. the light of sun, falls on the object, a correction of the data will already become necessary, whereas if it is from behind the object to be photographed that the light falls on the latter, the correction will have to be even greater.

It is, accordingly, evident, that the greater the intensity of the light to be dealt with, e. g. intense sunlight, and the less it is from the front that the rays of this source of light are illuminating the object to be photographed, the greater will be the correction required.

It is this correction which is provided automatically by the various kinds of apparatus according to the invention, this being done in such a manner that the said apparatus will automatically correct the exposure meter so as to take these points of view into account.

The simplest way to achieve this is by employing a type of apparatus in which the operation of the device for the measurement of the necessary amount of exposure or for light control is influenced in a suitable manner by another device of the photo-cell type, or possibly without the employment of a special photo-cell, either by optical or by electrical, or by mechanical or by any other known means.

The energy possessed by these compensating devices of the photo-cell type will, of course, only have to be sufficient for suitably correcting the energy of the exposure meter proper. Another fundamental condition of successful operation is that the device according to the invention for the measurement of the necessary amount of exposure or for light control will have to be calibrated in such a manner that in those cases when no correcting effect whatever has to be displayed by the compensating device, as for instance in case of measuring the necessary amount of exposure of an object illuminated by entirely flat illumination, such an exposure meter should indicate figures exactly equal to those indicated by another device for the measurement of the necessary amount of exposure or for light control not equipped with any compensating apparatus according to the invention.

It is a matter of course that all devices according to the invention for the measurement of exposure or for light control can be employed not only for all kinds of photometric measurements, but also for correcting the operation of semi-automatic or completely automatic devices of the photo-cell type employed in connection with photographic cameras, but for the sake of greater simplicity we shall, in the remaining part of this specification, pay no attention to this circumstance and refer to the devices according to the invention as if they were exposure meters only.

The plane of the surface of the compensating cell may form different angles with the plane of the fundamental cell.

For the sake of greater simplicity the cells marked 1 on the figures, on which light falls from the subject to be photographed, are called main cells, whereas the cells marked 2, which are compensating the operation of the instruments operated by the main cell by the greater or smaller quantity of luminous energy falling on them from the source of light, are called subsidiary cells.

The device according to the invention will operate in a faultless manner if the quantity of light falling from the source of light on the subsidiary cell is sufficient for causing the self-adjustment of the pointer of the instrument operated by the main cell to be influenced in such a degree as to ensure that the said pointer should always, independently of the position of the source of light, indicate the diaphragm or shutter figure corresponding to perfect exposure. That is to say, whether it is light coming from behind or light from the side or opposed light that is concerned— which opposed light may, of course, only be opposed light taken in the photographic sense, i. e. may not be, or may only in exceptional cases be, such opposed light as is situated within the image angle of the illumination meter, or, respectively, as shines also into the lens of the photographic camera—the exposure meter should always indicate that diaphragm or shutter figure which is required for the purposes of correct exposure. In other words, it should in the case of side light indicate an amount of exposure increased by about 30 to 50%, and in the case of opposed light an amount of exposure increased by 50 to 100%, or possibly by even more, as compared to the amount of exposure indicated by an exposure meter of the types employed up to now, to the indication of which latter 30 to 100% or even more have, exactly for this reason, to be added on the basis of an estimate, in the case of side or opposed light. The amount of correction will be different in each case and will vary from the smallest amount to the maximum, and therefore it is better to speak of limits of correction varying from 1 to 400%. In view hereof it is necessary that the quantity of energy received from the source of light by the subsidiary cell should be all the greater, the greater the difference by which the diaphragm or shutter figure indicated by the exposure meter not equipped with the apparatus according to the invention is smaller than the figure required from the point of view of correct exposure.

This purpose can be achieved by ensuring that, differently from what is the case with the main cell adjusted on the object to be photographed, the image angle of which cell is relatively low, the subsidiary cell should receive light practically only from the source of light and not from the object, although some light may reach it from the latter also. If the image angle of the subsidiary cell is very large, amounting e. g. to 180 degrees, and if at the same time its plane surface extends during measurement in a direction sloping upward, this is already sufficient for ensuring that if the light of the sun is approximately opposite to it, which means that the rays are falling on its surface approximately perpendicularly, the subsidiary cell should exert the maximum of compensating effect. On the other hand, if in the case of side light the light reaches the said plane slightly from the side, the subsidiary cell will in that case also exert its compensating effect, but in a substantially smaller extent, and this is indeed what is necessary, because in the case of photographs taken with side light it is not necessary to increase the exposure, as compared to the figures indicated by the instruments of the photo-cell type employed up to now, by so much as would be necessary in those cases when the sun more or less faces the photographer.

In order to ensure the perfect operation of the device according to the invention, it is, however, not only required that the mutual proportion of the angles of the two cells should be convenient, but provision has also to be made for the angle of the subsidiary cell being sufficiently large, or for ensuring by means of reflecting devices that the desired quantity of light should reach the subsidiary cell in all cases, and further for the surface area and the energy of the two cells, as well as all auxiliary devices serving for rendering the mutual effects of the two cells on each other perfect, as for instance all instruments, covering plates, etc., being of such a kind as to render the compensation perfect in all cases. It is easy to take all these factors into account empirically, and to ensure hereby that the device according to the invention should in all cases operate in a perfect manner.

Calibration is facilitated by the fact that it is necessary that in the case of flat lighting, i. e. in case the source of light illuminates the object to be photographed from behind the photographer, and in case there is hardly any shadow portion on the object to be photographed, the exposure meter according to the invention should indicate figures equal to those indicated by the exposure meters of the types employed up to now operating on the basis of an average quantity of light.

The exposure meter equipped with an automatic compensating device according to the invention should be amplified by the employment of a colour filter arranged in front of the cell or cells, which filter will in case the photo-cell is less sensitive for the so-called photographically dark colours, correct the measurement of light in a suitable manner from the point of view of such colours, in the first place of green, brown and red colours, situated on the area of the object to be photographed. The practical arrangement to be employed may be of very many kinds, because, as already mentioned above, it is not only in connection with exposure meters of the photo-cell type, but also in connection with all kinds of semi-automatic and completely automatic devices of the photo-cell type that the apparatus according to the invention can be employed. Thus, for instance, also in connection with the devices described in the British Patents Nos. 395,808 and 483,775 and in the French Patent No. 725,313.

Most of the various practical arrangements are illustrated on the figures enumerated below.

In the arrangement according to Figs. 1 and 2, 1 denotes the fundamental photo-cell and 2 the compensating photo-cell; for the sake of greater simplicity these will be called in this specification the main and the subsidiary photo-cell, respectively. The device for the measurement of exposure or for light control is operated by the main photo-cell 1, and the operation of the latter is decreased more or less by the subsidiary photo-cell 2.

It is a preferable possible arrangement to mount both photo-cells on a single base-plate. Their surfaces may be situated in the same plane, or in different planes. In case the main photo-cell is situated e. g. in a vertical plane, the surface of the subsidiary photo-cell may be facing obliquely upwards. It is, however, also possible just as well to imagine it arranged in any other plane, particularly if use is made of certain reflecting devices. It is also possible to employ more than one subsidiary photo-cell, similarly it is also possible to employ subsidiary photo-cells having a convex or concave surface instead of a plane surface, and, similarly, the reflecting surfaces employed may also be of any desired shape.

According to the arrangement shown by way of example on Fig. 1 the surface area of the main photo-cell 1 is substantially greater than that of the subsidiary photo-cell 2. In front of the subsidiary photo-cell 2 a light filter may also be provided which will allow more or less light to reach the cell from different directions, in accordance with practical necessity.

Of course, there is nothing to prevent the quantity of the light reaching the photo-cell either in case of the main or of the subsidiary photo-cell, the mutual angle formed by their planes, or the position of the reflecting surfaces being varied at any time by the photographer by means of any kinds of known devices.

For the purpose of projecting the side lights on the subsidiary photo-cell 2, it is also possible to employ devices enabling light to fall on the subsidiary cells even in case of side light of very small magnitude. This may be achieved by two subsidiary cells being arranged in the form of a wedge.

The arrangement according to Figs. 1 and 2 may also be varied so as to mount or construct the cells 1 and 2 so as to be situated in the same plane, possibly mounted on a common rear electrode plate.

Arrangements are also possible by means of which the side light also may be projected in a certain extent on the subsidiary cell 2 by means of mirrors or reflecting surfaces, which may be of any desired shape and of any desired curvature and of different strength of reflection.

Figs. 3 and 4 show an arrangement in which the subsidiary cell 2 on which the light is projected by the mirror 7 is mounted behind the main photo-cell 1. This mirror or reflecting surface may also be of concave shape or it may comprise a plurality of reflecting surfaces arranged at different angles.

The various kinds of apparatus of the photo-cell type described in what precedes possess a function based on such optical, electrical or mechanical principles to be described in detail below, which will ensure that in the case of side or opposed light the time of exposure measured by the main cell, and, correspondingly the shutter aperture of the object lens should be increased. The same effect may also be achieved by calibrating the time of exposure measured by the main cell in the case of side and opposed light at the figure increased to the necessary correct figure, or correspondingly by adjusting the operation of photographic cameras equipped with semi-automatic or completely automatic devices in a suitable manner, so that if the source of light is behind the operator, this light coming from behind should be projected on the fundamental or main cell itself, or possibly on a special subsidiary cell, and the exposure meter should in conformity with the greater effect of illumination of the said light measure a shorter time of exposure, or in the case of photographic cameras equipped with the devices in question adjust a smaller aperture of the object lens shutter.

In the case of this arrangement the photographer should take care to ensure that the source of light behind him should not be covered during the handling of the apparatus by any part of the apparatus.

Various kinds of circuit arrangements may be employed for the devices described above. The most simple method is to connect the two photo-cells directly into a common circuit with the measuring instrument. This can be performed in two different ways: (1) The two cells are connected in series in opposition to each other, i. e. the identical electrodes (e. g. the positive electrodes) are connected with each other, whilst the other two (in this case the negative) electrodes are connected to the terminals of the instrument. Such an arrangement is illustrated on Figs. 1 and 2. (2) The two cells are connected in parallel in opposition to each other, i. e. their opposite poles are connected with each other, and it is to these poles that the instrument is connected. Such an arrangement is shown on Figs. 3 and 4.

Fig. 5 represents an arrangement possessing the advantage of requiring a single-coil instrument only. Notably here a certain voltage drop is produced on the resistance 29 by the current of the main cell 1, whereas the subsidiary cell 2 produces a certain voltage drop on the resistance 30. The instrument 31 measures the difference of the two voltage drops, which in accordance with the principle concerned is all the smaller, the greater the quantity of light received by the subsidiary cell 2 as compared to that received by the main cell 1.

Although Figs. 1 to 5 are all representing exposure meters, it is nevertheless directly possible that the pointers operated in these devices should act the role of the pointer employed on a photographic camera equipped with a semi-automatic device, as described e. g. in the Hungarian Patent No. 109,132, and indeed also the role of a pointer employed on a photographic camera equipped with a completely automatic device, as, for instance, that of the pointer 3 shown on Fig. 1 of the Hungarian Patent No. 120,431.

I claim:

1. In a photo-electric exposure meter, a pair of photo-electric cells comprising a main cell and a subsidiary cell, the former of which has a surface area substantially greater than the surface area of the latter, the main cell being positioned to receive light predominantly from an illuminated photographic subject and the subsidiary cell being positioned to be affected by light surrounding the photographic subject, the surface of the subsidiary cell receiving substantially no light from the photographic subject but receiving light predominantly from directions other than the photographic subject and lying in a plane which is angularly disposed with respect to the plane of the surface of the main cell, indicating means operated by said cells, and an electric circuit including the two cells and the indicating means, said cells being so connected in the circuit that the current generated in each cell is in opposed relation to the current generated in the other cell.

2. In a photo-electric exposure meter as claimed in claim 1, the combination wherein said cells are arranged in series in said circuit.

3. In a photo-electric exposure meter as claimed in claim 1, the combination wherein said cells are arranged in parallel in said circuit.

4. In a photo-electric exposure meter as claimed in claim 1, the combination wherein reflecting means are employed for directing the light surrounding the photographic subject onto the subsidiary cell.

5. In a photo-electric exposure meter as claimed in claim 1, the combination wherein the electrical circuit has a pair of branch circuits each including one of said cells, and a resistance in each branch circuit, one end of the resistances being connected together and the other end of each resistance being connected to the indicating means.

LÁSZLÓ RISZDORFER.